US008621246B2

(12) United States Patent
Ravichandran et al.

(10) Patent No.: US 8,621,246 B2
(45) Date of Patent: Dec. 31, 2013

(54) POWER MANAGEMENT SYSTEM AND METHOD TO PROVIDE SUPPLY VOLTAGE TO A LOAD

(75) Inventors: Krishnan Ravichandran, Saratoga, CA (US); Lilly Huang, Portland, OR (US); Hee-Jun Park, Portland, OR (US); Alexander B. Uan-Zo-Li, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1042 days.

(21) Appl. No.: 12/646,092

(22) Filed: Dec. 23, 2009

(65) Prior Publication Data

US 2011/0154066 A1 Jun. 23, 2011

(51) Int. Cl.
*G06F 1/00* (2006.01)

(52) U.S. Cl.
USPC .......................................................... 713/300

(58) Field of Classification Search
USPC .......................................................... 713/300
See application file for complete search history.

(56) References Cited

U.S. PATENT DOCUMENTS

| | | | | |
|---|---|---|---|---|
| 6,240,379 | B1 * | 5/2001 | Yin | 704/200.1 |
| 6,292,902 | B1 * | 9/2001 | Drobnik | 713/320 |
| 6,366,434 | B2 * | 4/2002 | Magnussen | 361/55 |
| 7,366,924 | B2 * | 4/2008 | Hupman et al. | 713/300 |
| 8,411,624 | B2 * | 4/2013 | Stolyar et al. | 370/329 |
| 2005/0225909 | A1 * | 10/2005 | Yoshizaki et al. | 361/42 |
| 2006/0242439 | A1 * | 10/2006 | Hupman et al. | 713/320 |
| 2008/0162965 | A1 * | 7/2008 | Marinas et al. | 713/320 |
| 2010/0141282 | A1 * | 6/2010 | Heath et al. | 324/704 |
| 2011/0264422 | A1 * | 10/2011 | Mallet et al. | 703/2 |

* cited by examiner

*Primary Examiner* — Mohammed Rehman
(74) *Attorney, Agent, or Firm* — KED & Associates LLP

(57) ABSTRACT

A power manager controls the supply voltage level at a load according to load current demand, and optionally the impedance of the power delivery path, by adjusting the supply voltage. The supply voltage may be reduced by determining a fixed load current that corresponds to a first operating frequency, determining a supply voltage that corresponds to the fixed load current, and then powering the load based on the supply voltage. Alternatively, the supply voltage may be increased along with increasing the operating frequency of the load while maintaining system power consumption within a predetermined limit.

27 Claims, 9 Drawing Sheets

LOAD CURRENT ($I_{cc}$) RANGE
FOR AN OPERATING FREQUENCY (Fo), FOR
A SPECIFIC PERFORMANCE STATE (Po)

POWER MANAGEMENT SYSTEM AND METHOD TO PROVIDE SUPPLY VOLTAGE TO A LOAD

FIELD

One or more embodiments disclosed herein relate to managing power in electronic systems.

BACKGROUND

Power management has been a driving force in the design of many electronic systems, especially those that are battery powered. One approach to power management has been to increase the voltage capacity of batteries. Other approaches seek to power down system circuits to conserve battery life. However, these approaches have proven to have drawbacks.

DETAILED DESCRIPTION

One or more embodiments of the present invention manage power for operating an electronic system. The system may correspond to or include a central processing unit (CPU) of a computer, a microprocessor or controller of an electronic device such as mobile phone or media player, or a control circuit used to support any one of a variety of internet-based applications. The system may also correspond to or include another type of circuit or device that may not necessarily qualify as a CPU or processor, but which is capable of operating in a plurality of power or performance states, the relevance of which will be discussed in greater detail below.

Figure 1:
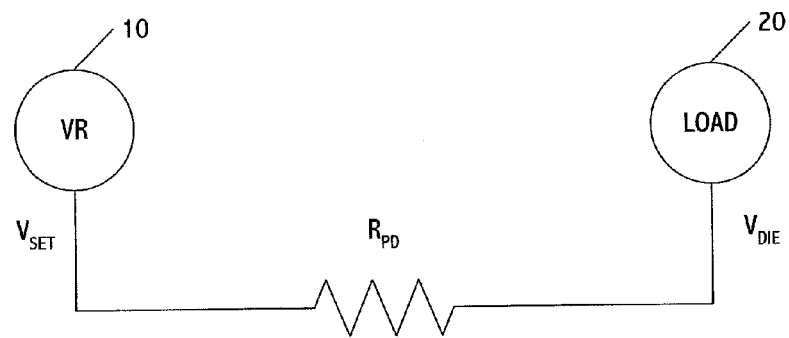
FIG. 1 is a diagram showing one type of power management system.

FIG. 1 shows one type of power management system which includes or is coupled to control a regulator circuit 10 for powering a load 20. The regulator circuit provides power to the load, for example, in the form of a supply voltage and/or current. The supply voltage may be a reference voltage or some other type of voltage. For the sake of illustration, the regulator circuit is shown as a voltage regulator (VR) circuit which outputs a supply voltage (Vset) to the load, which, for example, may be one of the electronic systems previously described.

Figure 2:
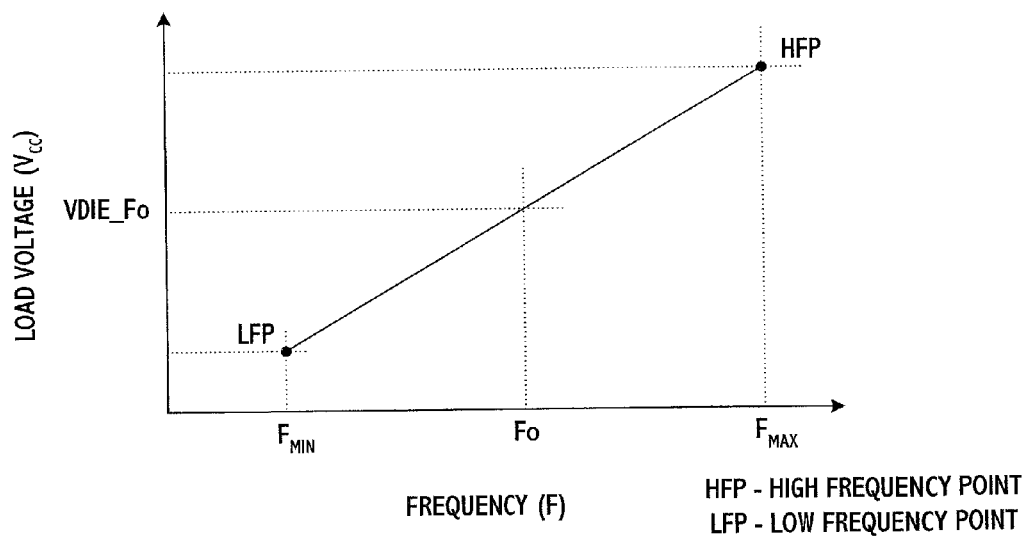
FIG. 2 is a graph showing a load line which may be used for managing power.

FIG. 2 shows an example of a load line which may be used as a guide for managing power to the load. In this example, the load line has a generally linear shape that defines the relationship between the operating frequency (F) and the supply voltage of the load. The operating frequency of the load may be considered a function of the gate-drive voltage applied to transistors coupled to or included in the load, and the supply voltage may correspond to the output of the voltage regulator circuit (with or without taking losses into consideration).

As is evident from the increasing slope of the load line, the operating frequency of the load is directly proportional to the supply voltage. Also, as shown, the load line is bound between a low-frequency point (LFP) and a high-frequency point (HFP), both of which are determined based on design specifications. The values on the load line between the two points may be determined, for example, based on worst-case load conditions taking losses into consideration.

More specifically, operating points on the load line may be associated with specific performance states (Px) of the load. These performance states operate at different frequencies and may use different amounts of power.

In order to use the load line, first, the performance state of the load must be determined. Then, the operating frequency corresponding to this performance state is determined, for example, in accordance with design specifications. The load line is then used to determine the supply voltage for the load based on the operating frequency.

In the case where the load is a CPU, the supply voltage may correspond, for example, to the voltage supplied to the CPU. Thus, for a performance state PO of the CPU operating at frequency Fo, the voltage regulator circuit is controlled to output a supply voltage of sufficient size which causes the CPU to receive an actual voltage VDIE_Fo as shown in FIG. 2. That is, in order for the load transistors to operate properly, a minimum voltage of VDIE_Fo must be received by the CPU.

More specifically, in a practical application, losses must be taken into consideration when determining the supply voltage (Vset) output from the voltage regulator circuit. More specifically, in order to satisfy load-line requirements, the supply voltage received by the CPU must correspond to VDIE_Fo or greater. Because of losses, the input voltage actually received by the CPU will be less than the supply voltage Vset output from the voltage regulator circuit.

These losses include, for example, variations in workload, system parasitics, line resistance, and variations in temperature to name a few. These losses (which are collectively expressed as resistance $R_{PD}$ in FIG. 1) reduce the supply voltage output from the voltage regulator circuit and therefore must be taken into consideration when calculating Vset.

That is, in order to guarantee that the minimum voltage of VDIE_Fo required to drive the CPU is satisfied during the entire period of operation of the CPU in the Po state, the supply voltage Vset output from of the voltage regulator circuit must be programmed to be higher than VDIE_Fo, to offset losses from resistance $R_{PD}$.

According to one technique, the supply voltage Vset to be output from the voltage regulator circuit for a load operating at frequency Fo may be computed based on Equation (1):

$$V_{set}(Fo) = I_{MAX\_Fo} * R_{PD} + VDIE\_Fo \quad (1)$$

where $I_{MAX\_Fo}$ is the maximum current drawn by the load operating at frequency Fo under worst-case loss conditions and $R_{PD}$ is, as previously explained, the equivalent resistance of the power delivery path from the voltage regulator circuit to the load under worst-case loss conditions. In addition to reducing the supply voltage, the losses represented by $R_{PD}$ may cause the current drawn by the CPU operating at frequency Fo to be lower than the maximum current $I_{MAX}$_Fo. These effects translate into wasted power in a manner that will now be explained.

Figure 3:
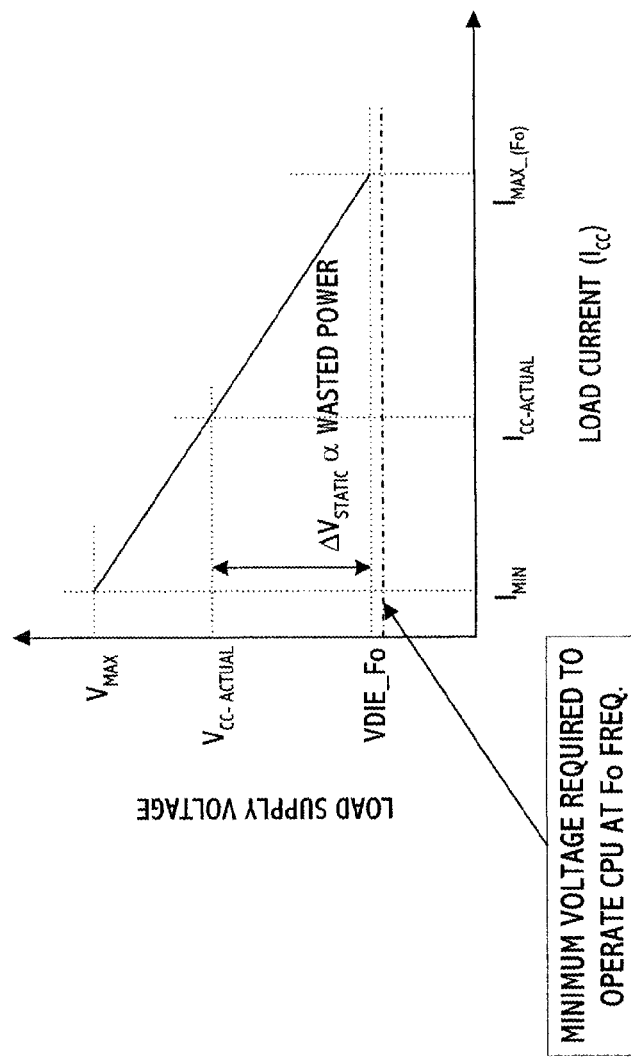
FIG. 3 is a graph showing a power curve used to manage power using a static analysis that is based on the load line in FIG. 2.

FIG. 3 shows a power curve that defines a relationship between the load current (Icc) and supply voltage for the load line in FIG. 2. Because of losses, the actual current $Icc_{\_ACTUAL}$ drawn by the load is less than the maximum current $I_{MAX}$_Fo. In order to compensate for this lower current, the supply voltage (Vset) output from the voltage regulator circuit must be increased so that the operational requirements of the CPU transistors can be satisfied when operating at frequency Fo.

The increase in Vset generates a proportional increase in the actual voltage ($Vcc_{\_ACTUAL}$) received by the CPU. As shown in FIG. 3, this actual voltage is greater than the minimum voltage, VDIE_Fo, required to operate the transistors, i.e., $Vcc_{\_ACTUAL}$>VDIE_Fo when $Icc_{\_ACTUAL}$<$I_{MAX}$_Fo. The excess voltage ($\Delta V_{static}$) above the minimum operating voltage ($\Delta V_{static}$=$Vcc_{\_ACTUAL}$−VDIE_Fo) is not used. This results in a waste of power which may be expressed by Equation (2) when the CPU operates at frequency Fo and draws current $Icc_{\_ACTUAL}$ in state Po:

$$P_{WASTE} = \Delta V_{static} * Icc_{\_ACTUAL} \quad (2)$$
$$= (Vcc_{\_ACTUAL} - VDIE\_Fo) * Icc_{\_ACTUAL}$$

The waste in power evident from Equation (2) is based, in part, on application of a static load-line analysis performed by the power management system. According to this analysis, the supply voltage is changed only when the processor performance state (Px) changes. Otherwise, the supply voltage is fixed by the load-line for a given CPU operating frequency.

Processor performance states may vary depending on design specifications, requirements of the host system, and/or other factors. One non-limiting example of the performance states of a CPU in a typical notebook computer is as follows:

| State | Description |
| --- | --- |
| C0 | normal operation state |
| C1 | halt state where processor is not executing instructions |
| C2 | stop-clock state where processor maintains software-visible state |
| C3 | sleep state where processor does not keep cache coherent and all clocks are stopped |

When implementing a static load-line analysis, a state change of the CPU may involve, for example, a transition to the C3 state from one of the other states. When this occurs, the power management system determines the processor frequency corresponding to the C3 state and then uses the load line to determine the supply voltage corresponding to that frequency. A voltage identification (VID) code is then sent to the voltage regulator circuit identifying the supply voltage, and an internal phase locked-loop is locked to output a corresponding supply voltage Vset for powering the load.

The static approach, however, does not take into consideration fluctuations in load current, nor does it take any action for purposes of preventing power waste as in Equation (2).

Moreover, supply voltage Vset is determined, as previously indicated, based on worst-case conditions including worst-case workload ($Icc_{-MAX}$ for Fo) and worst-case design parasitics (e.g., Vcc trace & package parasitics). Because the load does not normally operate under worst-case conditions, there is a large guard band built into the supply voltage in order to guarantee that the load receives a certain minimum voltage required to drive the load transistors. This large guard band is often unnecessary and results in a significant waste of power under most application scenarios.

Figure 4:
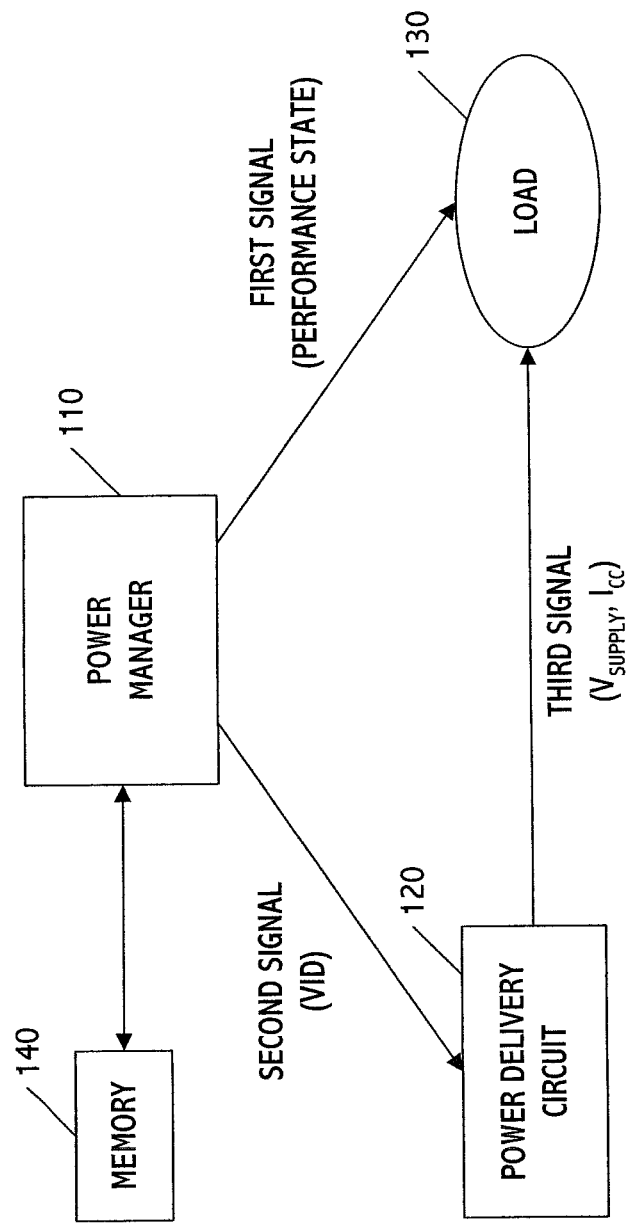
FIG. 4 is a diagram showing another type of power management system.

FIG. 4 shows one embodiment of a power management system that uses a dynamic approach to supplying power to an electronic system. The electronic system may be a processing system as previously described, a logic system, or any other type of system, circuit, or device which is to receive power for performing one or more specific operations and which operates in multiple performance states.

As shown in FIG. 4, the power management system includes a power manager 110, a power delivery circuit 120, and a load 130 that corresponds to the electronic system previously described. The power manager may be implemented as a circuit or software or a combination of both. According to one embodiment, the power manager resides in platform core logic (e.g., a chipset) that controls or otherwise interacts with the power delivery circuit and/or load. When the load includes a central processing unit (CPU) or other type of processor, the power delivery circuit may be a voltage regulator circuit. Other types of loads and power delivery circuits may be used in alternative embodiments.

The power manager operates by dynamically tuning a load line for controlling the supply voltage to the load. This is accomplished, first, by defining a range of current that can be input into or drawn by the load (load current (Icc) range) and then dividing that range into a plurality sub-bands.

Figure 5:
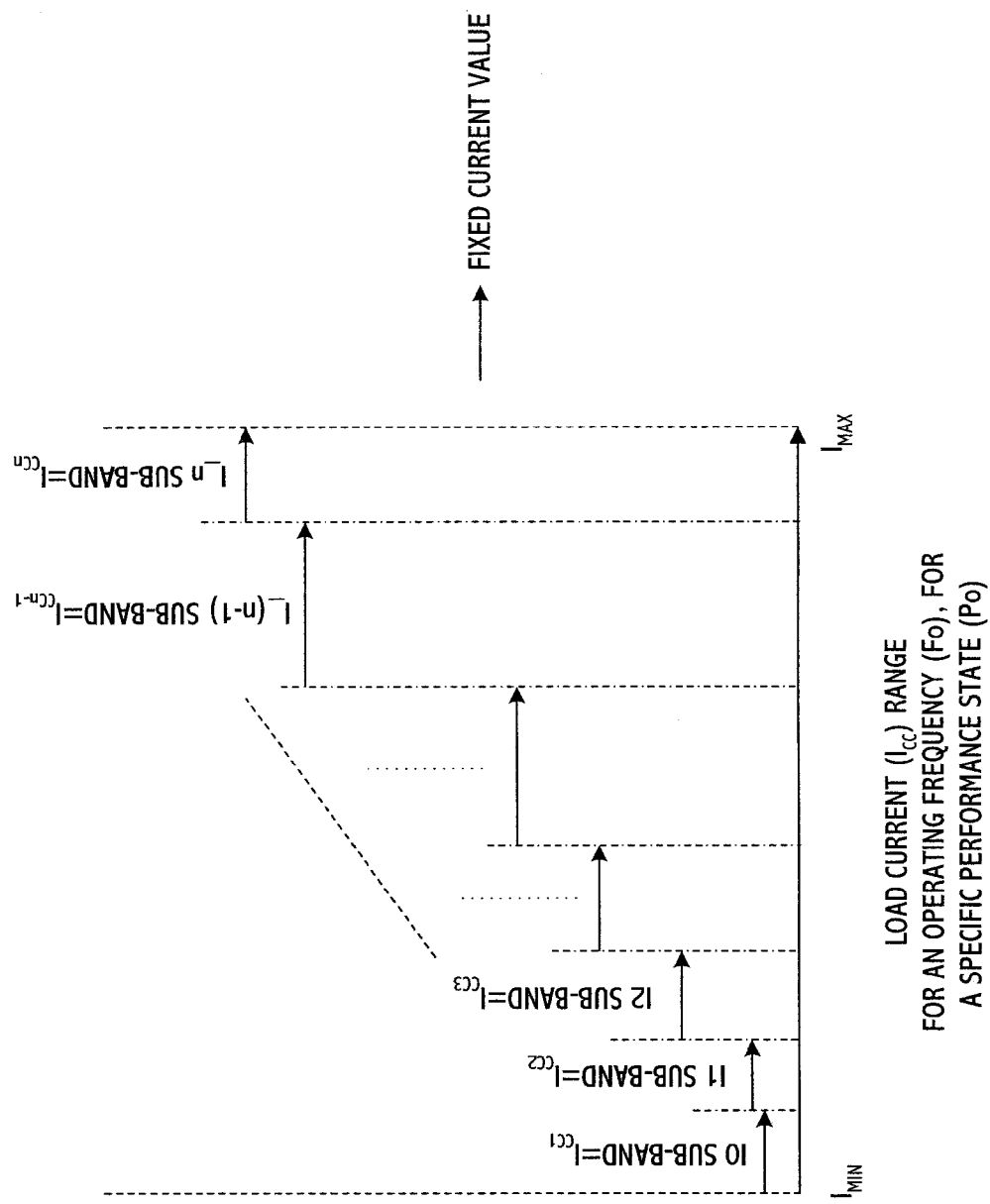
FIG. 5 is a diagram showing a load current range divided into multiple sub-bands.

FIG. 5 shows one example of a load current range defined between minimum ($I_{MIN}$) and maximum ($I_{MAX}$) values, which may be determined, for example, based on design specifications of the load, performance limits of the power delivery circuit, and/or one or more other parameters. In this particular example, the load is a processor (e.g., a CPU) and the load current range is divided into N sub-bands, I0 to IN, for a given operating frequency (Fo) of the processor operating in a specific performance state (Po).

The sub-bands may have equal or different widths. In the example shown in FIG. 5, the sub-band widths tend to increase except for the last sub-band. In other embodiments, a different arrangement of sub-band widths may be used.

Also, as shown by the horizontal arrows in FIG. 5, a fixed current value may be assigned to each sub-band. That is, the first sub-band (J0) is assigned a current value $Icc_1$, the second sub-band is assigned a current value $Icc_2$, and so on. The fixed current value assigned to each sub-band may be representative of the currents in that band. For example, the current value assigned to each sub-band may be a minimum current value, a maximum current value, or an average value of that sub-band.

Assigning a fixed current value to each sub-band reduces the supply voltage to the load, and at the same time may reduce power waste in driving the load. This reduction is apparent from the inverse relationship that exists between the supply voltage of the load and the load current. That is, power is computed based on the product of voltage and current (i.e., P≈V*I). By assigning fixed current values to the sub-bands of the load current range, load current (Icc) may be maintained at a comparatively higher value than used in a static power management scheme. As a result, the minimum power requirements of the load may be satisfied using a proportionally smaller supply voltage. The ability to use a smaller supply voltage translates into a smaller ΔV value in Equation (2), which, in turn, may translate into power savings.

Figure 6:
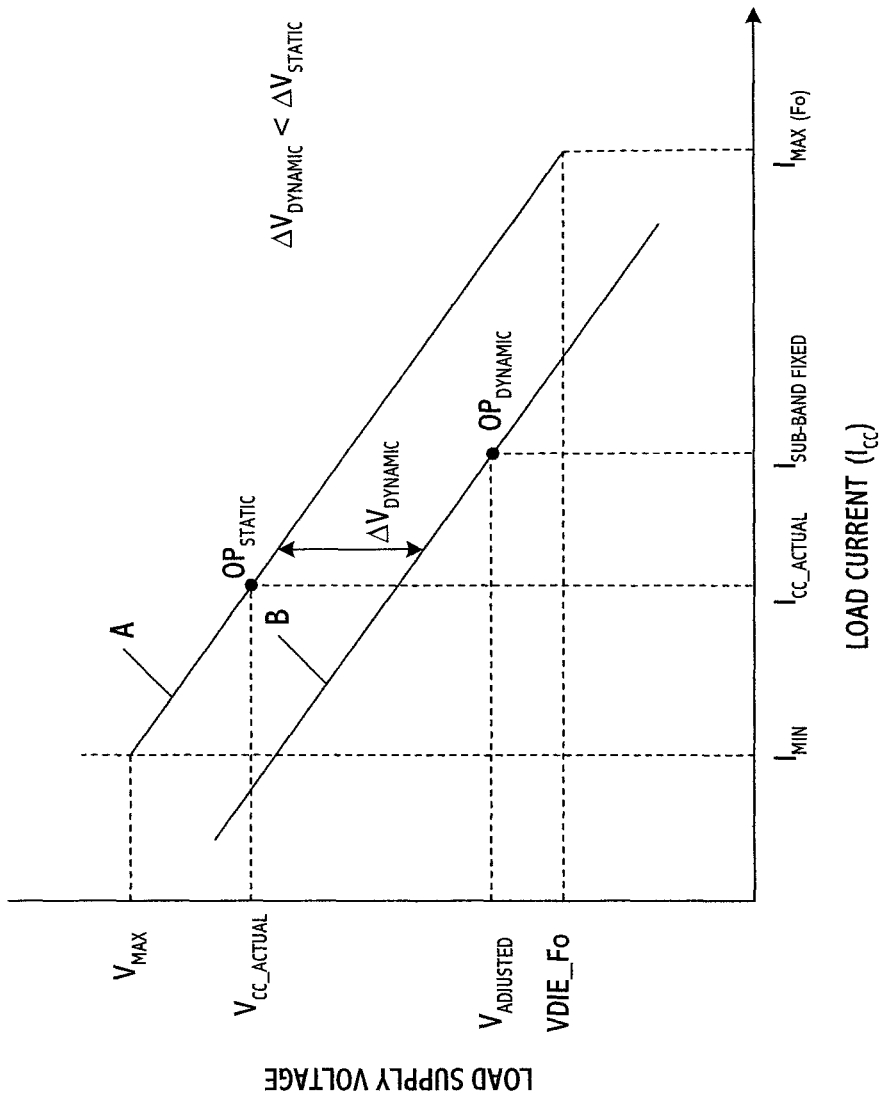
FIG. 6 is a diagram showing a power curve used to manage power using a dynamic analysis that is based on the load current range in FIG. 5.

FIG. 6 shows how the power curve for the system of FIG. 4 may be dynamically tuned to achieve power savings in driving the load. In FIG. 6, power curve A shows the relationship that exists between load current and supply voltage in the case where a static load-line analysis is used such as shown in FIG. 3. The operating point $OP_{static}$ corresponds to a load current $Icc_{actual}$ and supply voltage $Vcc_{actual}$, and VDIE_Fo corresponds to the minimum operating voltage required by the load operating at frequency Fo for state Po with maximum load current ($Icc_{Max}$).

Using the load current range of FIG. 5, power delivery circuit 120 may be controlled by power manager 110 to output a load current value, Icc, for performance state Po at frequency Fo. This is accomplished by determining in which sub-band of FIG. 5 the actual load current, $Icc\_{ACTUAL}$, is located and then controlling the power delivery circuit to output the fixed current value that corresponds to that sub-band. When the fixed current value is greater than the actual load current $Icc\_{ACTUAL}$, the supply voltage can be significantly reduced and power savings may be realized over the static power management approach.

This power savings is evident from a comparison of the static analysis performed using the load line in FIG. 3, which corresponds to power curve A in FIG. 6. As shown, a relatively large value of the supply voltage to the load, $Vcc\_{ACTUAL}$, is used based on the actual load current ($Icc\_{ACTUAL}$), which is reduced from its maximum value ($I_{MAX}$_Fo).

However, unlike the static analysis performed using the power curve of FIG. 3, the dynamic analysis performed by the power manager of FIG. 4 causes the power delivery circuit to output the fixed current value of the sub-band in FIG. 5 in which $Icc\_{ACTUAL}$ is located, instead of $Icc\_{ACTUAL}$. This fixed current value is shown in FIG. 6 as $I_{sub\text{-}band\,fixed}$, taking losses into consideration. That is, $Icc=I_{sub\text{-}band\,fixed}$. Because $I_{sub\text{-}band\,fixed} > ICC\_{ACTUAL}$ in FIG. 3, a lower value of supply voltage, $Vcc=Vset=V_{adjusted}$, is output from the power delivery circuit as a supply voltage to the load than in the static analysis case; that is, $V_{adjusted} < Vcc\_{ACTUAL}$.

Using the fixed current values in the sub-bands of the load current range of FIG. 5 generates a new power curve B, which effectively represents a shift in the position of power curve A in FIG. 6. This shifted curve allows for the supply voltage to be reduced closer to the minimum supply voltage (VDIE_Fo) required to drive the load (processor) operating at frequency Fo and in performance state Po. The reduction in supply voltage generates a smaller excess voltage ($\Delta V_{dynamic}$) compared with the excess voltage generated in the static case ($\Delta V_{static}$), $\Delta V_{dynamic} < \Delta V_{static}$. As a result, less supply voltage is wasted which may translate into significant power savings. Even in the case where the same amount of power is consumed, the reduction in supply voltage may serve to improve performance.

The reduction in supply voltage is further apparent from Equation (3). In this equation, $V_{set}$ corresponds to the supply voltage from power delivery circuit 120 taking losses (represented by $R_{PD}$) into consideration.

$$V_{set} = I_{sub\text{-}band\,fixed} R_{PD} + V_{Adjusted} \quad (3)$$

For the same losses ($R_{PD}$), a lower supply voltage ($V_{adjusted}$) may be used to drive the load compared with the static power management technique with the same or less power consumption. The possible power savings ($P_{SAVE}$) is represented based on Equation (4).

$$P_{SAVE} = I_{sub\text{-}band\,fixed}(Vcc\_{ACTUAL} - V_{Adjusted}) \quad (4)$$

In this equation, $Vcc\_{ACTUAL}$ corresponds to the actual supply voltage provided in the static analysis case, taking losses into consideration, as shown in FIG. 3 and by power curve A. When compared to Equation (2), it is apparent that load current $I_{sub\text{-}band\,fixed}$ and supply voltage $V_{Adjusted}$ have been substituted in Equation (4) for load current $Icc\_{ACTUAL}$ and supply voltage $Vcc\_{ACTUAL}$, in Equation (2). Because $V_{adjusted}$ is less than $Vcc\_{ACTUAL}$, less power is wasted and a lower supply voltage is realized.

According to one embodiment, the current value assigned to each sub-band may be weighted in order to achieve an even greater reduction in supply voltage to the load and thus a greater reduction in power waste. In addition, load current ranges with predefined sub-bands may be determined for multiple performance states of the processor. These ranges may then be used to manage supply voltage and power to the load when performance states are changed.

Figure 7:
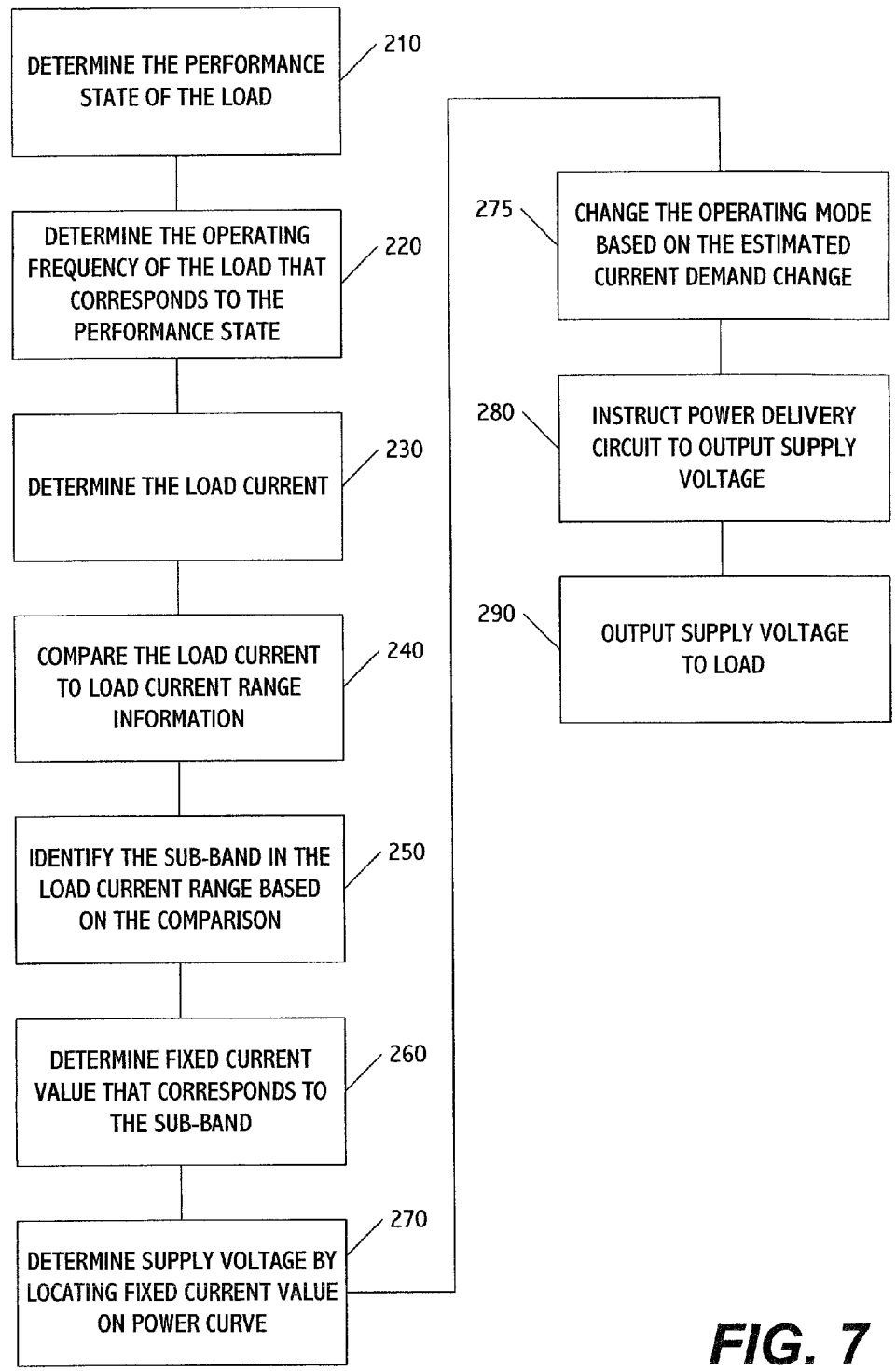
FIG. 7 is a diagram showing operations included in a first embodiment of a method for managing power of an electronic system.

FIG. 7 shows operations performed in a first embodiment of a method for managing power to be supplied to a load. The method may be implemented, for example, using the power manager shown in FIG. 4 and the load current range and power curve shown in FIGS. 5 and 6. However, other load current ranges and power curves may be used. Further, it may be assumed that the load is a central processing unit (CPU) of a computer. However, a different type of processor or electronic circuit, device, or system may be used in alternative embodiments.

In an initial operation, the power manager determines the performance state of the load. (Block 210). This performance state may be, for example, any of the aforementioned C-type states, one of a plurality of power states of a computer, or another type of operating state.

Once the performance state is determined, the power manager determines the operating frequency of the load and then sends a first signal to the load, in order to cause the load to operate in that state and at that frequency. (Block 220). Alternatively, the signal to the load be may be sent after the power manager controls the power delivery circuit to output a specific supply voltage to the load.

The load current is then determined by the power manager. (Block 230). This is accomplished based on one or more of the following factors: the operating state of the load, the operating frequency of the load, the actual temperature of the die or chip containing the power management system, process skew, and/or the dynamic activity factor of the load which, for example, may provide an indication of the percentage of transistors that are active (e.g., not clock-gated) at a given instant. Any one of a variety of algorithm and techniques known to those skilled in the art may be used for predicting the load current based on these factors. In accordance with one non-limiting embodiment, these techniques may, for example, provide an estimate of load current for the maximum possible load current in the current operating state and conditions.

Once the load current is known, the power manager compares the load current to load current range information stored in a memory or register 140, that is either located in or coupled to the power manager. (Block 240). The load current range information may correspond, for example, to a load current range like that shown in FIG. 5 for the particular operating state and frequency of the load. Based on this comparison, the power manager identifies the sub-band in which the load current drawn by the load is located (Block 250) and the fixed current value ($I_{sub\text{-}band\,fixed}$) that corresponds to this sub-band (Block 260).

The power manager, then, accesses power curve information that corresponds to the load current range information. The power curve information may include a dynamically shifted power curve like that shown in FIG. 6. By locating the fixed current value of the relevant sub-band on this curve (e.g., power curve B), the power manager is able to identify the corresponding supply voltage ($V_{adjusted}$), which is lower than the supply voltage defined by the power curve used for static power management analysis. (Block 270).

With this information now determined, the power manager sends a second signal to the power delivery unit 120 to instruct the power delivery circuit to output a supply voltage (Vcc) and/or load current (Icc) that match the values of $V_{adjusted}$ and $I_{sub-band\ fixed}$ determined by the shifted power curve and fixed current value of the sub-band, respectively. (Block 280). According to one embodiment, the power delivery circuit may only output supply voltage Vcc and this will cause the load to draw a current of Icc. The second signal may be sent, for example, in the form of a voltage identification (VID) code.

In response to the second signal, the power delivery circuit outputs a third signal containing information identifying the supply voltage and load current (e.g., $V_{adjusted}$ and $I_{sub-band\ fixed}$) to cause the load to operate according to these values. (Block 290). As a result, the load is controlled to operate using a lower supply voltage compared with the static power management technique and possibly lower power.

In an optional Block 275, the power delivery circuit may change its operating mode based on the estimated current demand change at the beginning of load transition. The operations performed in one or more of Blocks 280 and 290 may then be performed based on the changed operating mode.

According to one alternative embodiment, the second signal to the power delivery circuit may be output after the first signal to the load or these signals may be output simultaneously. According to another embodiment, the second and third signals many be output after or simultaneously with the first signal.

In FIG. 4, the power manager is shown as being located outside the power delivery circuit. In an alternative embodiment, the logic that performs the operations of the power manager may be located in the power delivery circuit. In this case, the power manager can directly notify the power delivery circuit of the load current and supply voltage to be used in operating the load, i.e., a direct-signaling approach many be used instead of the use of voltage identification (VID) signals or codes. According to one practical application, a 3-bit identification signal may communicate 8 sub-bands of load current, and the power delivery circuit (e.g., voltage regulator circuit) may internally convert the fixed current value corresponding to a relevant one of the sub-bands to generate a lower supply voltage to the load.

Figure 8:
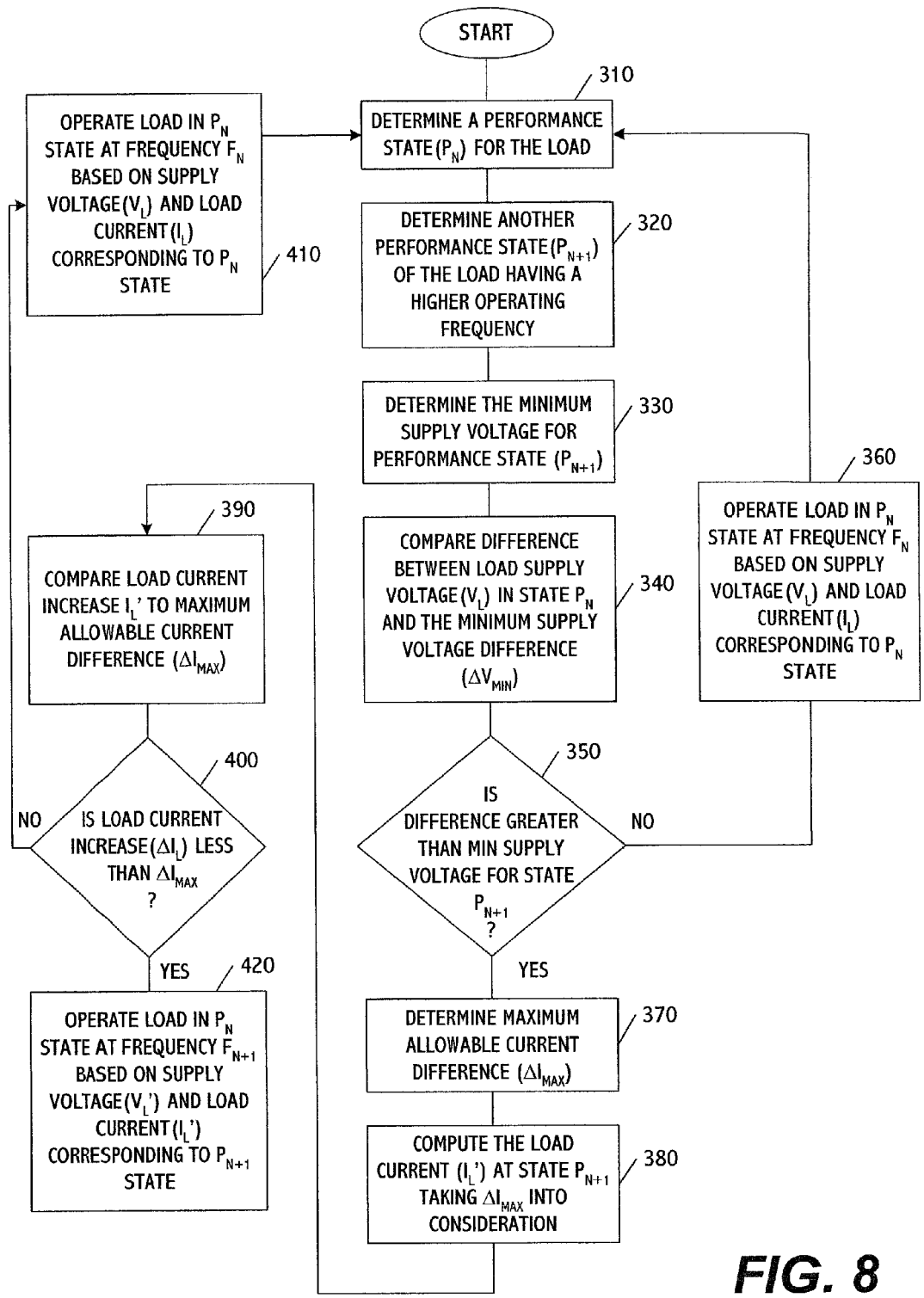
FIG. 8 is a diagram showing operations included in a second embodiment of a method for managing power of an electronic system.

FIG. 8 shows operations included in a second embodiment of a method for managing power to a load. Unlike the first embodiment, the second embodiment lowers the supply voltage by increasing the operational frequency of the load while at the same time keeping power to the load at the same or substantially constant level. That is, in the first embodiment, the supply voltage was reduced while maintaining the frequency (and thus the performance state) of the load at the same or substantially constant level. This could be accomplished using less power. However, in the second embodiment, the supply voltage is reduced while changing the operational frequency of the load at the same or substantially constant power.

The method of the second embodiment may be implemented using, for example, the power manager shown in FIG. 2. An initial operation of this method includes determining a performance state ($P_N$) in which the load is currently operating or in which the load is intended to operate. (Block 310). In the case where the load is a central processing unit of a computer, the performance state may, for example, be any one of the states previously discussed. In other applications, the load may be another type of processor or electronic circuit which is capable of operating in different performance or power states.

Once the performance state of the load has been identified, the minimum supply (or reference) voltage to the load may be determined from design specifications. However, in accordance with the second embodiment, the supply voltage is reduced according to a dynamic analysis which involves using a frequency, supply voltage, and/or load current that corresponds to another performance state of the load.

Accordingly, a next operation of the method includes determining another performance state of the load which requires a higher operating frequency than the operating frequency ($F_N$) required for performance state $P_N$. (Block 320). This other performance state may be represented as ($P_{N+1}$) and may, for example, correspond to a next performance state or any other performance state having a higher operating frequency than $P_N$.

Figure 9:
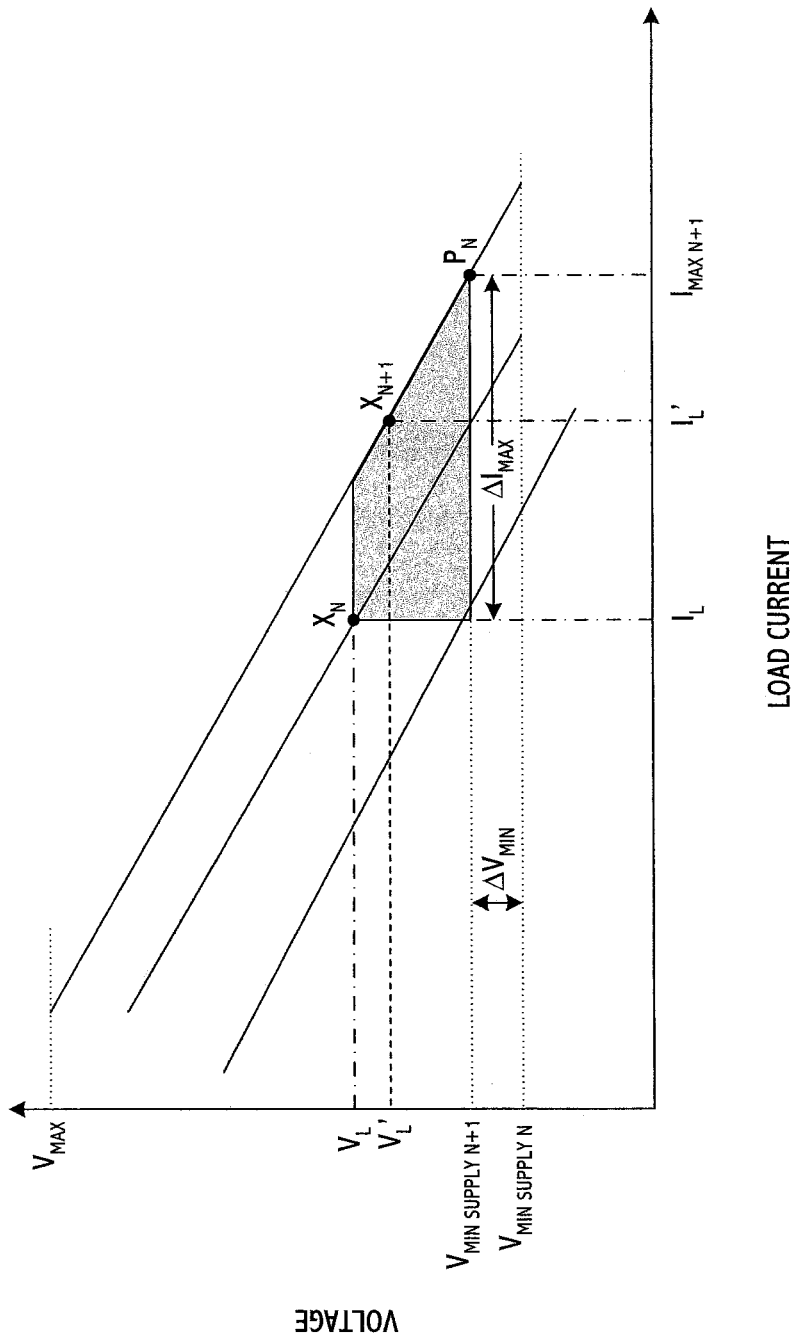
FIG. 9 is a diagram showing a power curve that may be used in controlling power to the electronic system managed by the method of FIG. 8

Once the other performance state has been selected, the minimum supply voltage for operating the load in that state is determined. (Block 330). This determination may be made, for example, based on a load line such as the one shown in FIG. 9, which may be generated based on design specifications of the load. In FIG. 9, the operating frequency and minimum supply voltage for performance state $P_N$ is shown to be $F_N$ and $V_{mn\ supply\ N}$, respectively, and the operating frequency and minimum supply voltage for performance state $P_{N+1}$ is shown to be $F_{N+1}$ and $V_{mn\ supply\ N+1}$. As shown, the minimum supply voltage for state $P_{N+1}$ is greater than the minimum supply voltage for state $P_N$ and the difference between the minimum supply voltages for these state is shown as $\Delta V_{min}$. This information may be stored in a memory accessible to the power manager.

Once the minimum supply voltage for state $P_{N+1}$ is determined, a next operation includes computing the difference between the supply voltage of the load ($V_L$) in state $P_N$ and the minimum supply voltage difference $\Delta V_{min}$. (Block 340). That difference is compared to the minimum supply voltage for state $P_{N+1}$, i.e., $V_{mn\ supply\ N+1}$. (Block 350). If the difference is not greater than the minimum supply voltage (that is, if $V_L - \Delta V_{min} \leq V_{mn\ supply\ N+1}$), then the load is controlled to operate, or continues to operate, in the $P_N$ state at frequency $F_N$ based on supply voltage $V_L$ and a corresponding load current $I_L$ that is determined relative to minimum supply voltage $V_{mn\ supply\ N}$ for state $P_N$. (Block 360). Control then returns to Block 310.

In an optional block, the power delivery circuit may change its operating mode based on the estimated current demand change at the beginning of load transition. This operation may be performed, for example, after the supply voltage is determined. The remaining operations may then be performed based on this changed operating mode.

FIG. 9 shows power curves which the power manager may use as a guide for controlling operation of the load for states $P_N$ and $P_{N+1}$. The power curve for state $P_N$ shows the supply voltage and load current, $V_L$ and $I_L$, that are determined relative to minimum supply voltage $V_{mn\ supply\ N}$. The operating point ($X_N$) on the power curve corresponding to $V_L$ and $I_L$ may correspond to the value $V_{set}$, which may be computed taking losses (e.g., $R_{PD}$) into consideration as previously explained.

If the difference between the supply voltage ($V_L$) of the load in state $P_N$ and the minimum supply voltage difference $\Delta V_{min}$ is greater than the minimum supply voltage for state $P_{N+1}$ (that is, if $V_L - \Delta V_{min} > V_{mn\ supply\ N+1}$), as determined in Block 350, then a next operation includes determining the maximum allowable current difference ($\Delta I_{Max}$). (Block 370). In accordance with the second embodiment, the value $\Delta I_{Max}$ is determined to be the maximum current difference allowable while (1) maintaining the power to the load at the same or substantially constant level as for $P_N$ and (2) remaining at least substantially within the range defined by the minimum supply voltage difference $\Delta V_{min}$ shown in FIG. 9.

In accordance with one embodiment, the maximum allowable current difference ($\Delta I_{Max}$) may be computed based on Equation (5) taking losses in to consideration. The value of $\Delta I_{Max}$ is shown in FIG. 9.

$$\Delta I_{Max}=1/R_{PD}*(\Delta V_{min}(1-\Delta V_{min}/V_L)) \quad (5)$$

When taking losses into consideration (i.e., when setting the value of $V_{set}$ for driving the load), it is understood that the supply voltage ($V_L'$) and load current ($I_L'$) for powering the load in state $P_{N+1}$ will be higher than the values corresponding to point $X_N$ in FIG. 9. Accordingly, a next operation of the method includes computing the load current ($I_L'$) at state $P_{N+1}$ taking $\Delta I_{max}$ into consideration. (Block 380). This current may be computed relative to the load current $I_L$ for state $P_N$ based on based on Equation (6):

$$I_L'=\Delta I_L+I_L \quad (6)$$

In this equation, $\Delta I_L$ corresponds to the increase in current relative to load current $I_L$ in order to achieve load current $I_L'$ for state $P_{N+1}$. The value $\Delta I_L$ may be computed using Equation (7):

$$\Delta I_L=I_L((1-\Delta V_{min}/V_L)*(F_{N+1}/F_N)-1) \quad (7)$$

where $F_N$ corresponds to the operating frequency of the load in state $P_N$ and $F_{N+1}$ corresponds to the operating frequency of the load in state $P_{N+1}$.

Once the increase in load current $\Delta I_L$ is computed, a next operation includes comparing the load current increase to the maximum allowable current difference $\Delta I_{Max}$. (Block 390). If $\Delta I_L \geq \Delta I_{Max}$, then the load is controlled to operate, or continues to operate, in the $P_N$ state at frequency $F_N$ based on supply voltage $V_L$ and a corresponding load current $I_L$. (Block 410). Control then returns to Block 310.

If $\Delta I_L < \Delta I_{Max}$, then the power manager generates a signal to cause the power delivery circuit to output $V_L'$ as a supply voltage and as the current to the load. (Block 420). That is, while the load is operating in the $P_N$ state, the power manager controls the power delivery circuit to output a load current ($I_L'$) and supply voltage ($V_L'$) that corresponds to the $P_{N+1}$ state and at the higher operating frequency $F_{N+1}$ of the $P_{N+1}$ state.

As indicated above, the value of $V_L'$ is set high enough so that the supply voltage received by the load equals or corresponds substantially to the minimum supply voltage ($V_{min\ supply\ N+1}$) for state $P_{N+1}$. As shown in FIG. 9, the operating point ($V_L'$, $I_L'$) lies in the shaded area and operating point (Y) correspond to the minimum supply voltage and load current at this point; that is $Y=(V_{min\ supply\ N+1}, I_{max\ N+1})$. An example of where ($V_L'$, $I_L'$) may occur on the $P_{N+1}$ power curve is shown by operating point $X_{N+1}$.

After the signal for Block 420 is generated, the power manager may output a signal to the load in order to cause the load to operate in the $P_N$ state but at the frequency $F_{N+1}$. The higher frequency of the $P_{N+1}$ state allows the load to operate at a lower supply voltage at the same or substantially the same power that would be consumed by the load operating using $P_N$ state parameters. As previously indicated, the supply voltage received by the load may correspond to a reference voltage and/or a minimum voltage required to ensure proper operation of the transistors of the load. In an alternative embodiment, this signal may be output to the load before the signal output for Block 420.

Figure 10:
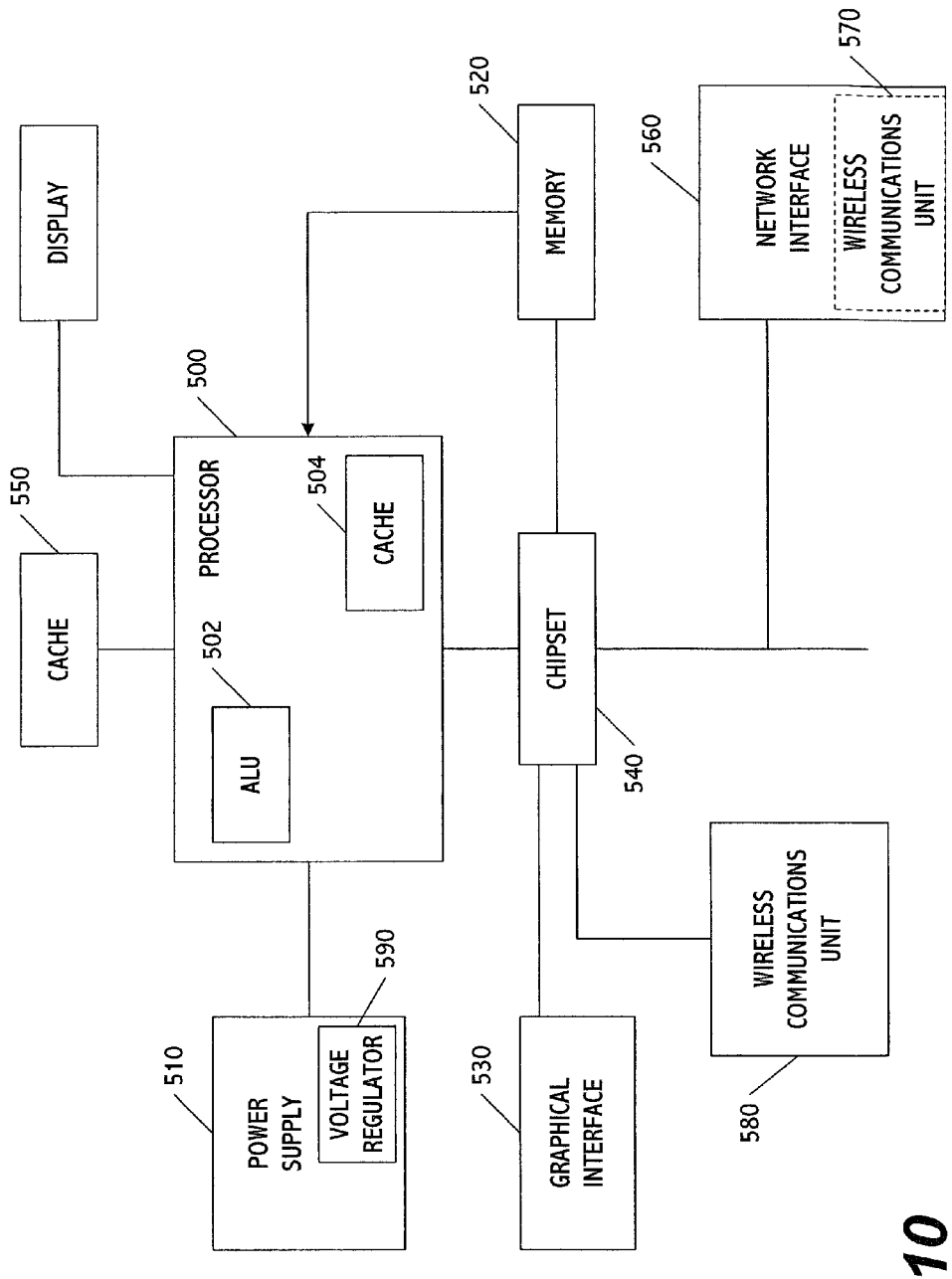
FIG. 10 is a diagram showing a power management system for a processor.

FIG. 10 shows a system which includes a processor 500, a power supply 510, and a memory 520 which, for example, may be a random-access memory. The processor includes an arithmetic logic unit 502 and an internal cache 504. The system may also include a graphical interface 530, a chipset 540, a cache 550, a network interface 560, and a wireless communications unit 570, which may be incorporated within the network interface. Alternatively, or additionally, the communications unit 580 may be coupled to the processor, and a direct connection may exist between memory 520 and the processor as well.

A power management system in accordance with any of the aforementioned embodiments of the present invention may be coupled to or included in a voltage regulator 590 included in the power supply, for purposes of controlling power to processor 500.

The processor may be a central processing unit, a microprocessor, or any other type of processing or computing circuit and may be included on a chip die with all or any combination of the remaining features, or one or more of the remaining features may be electrically coupled to the microprocessor die through known connections and interfaces. Also, the connections that are shown are merely illustrative, as other connections between or among the elements depicted may exist depending, for example, on chip platform, functionality, or application requirements.

Any reference in this specification to an "embodiment" means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Furthermore, for ease of understanding, certain functional blocks may have been delineated as separate blocks; however, these separately delineated blocks should not necessarily be construed as being in the order in which they are discussed or otherwise presented herein. For example, some blocks may be able to be performed in an alternative ordering, simultaneously, etc.

Although the present invention has been described herein with reference to a number of illustrative embodiments, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

We claim:

1. A power management system comprising:
a power delivery circuit to output power to a load; and
a power manager to control the power delivery circuit,
wherein the power manager is to determine a fixed load current that corresponds to a first performance state of the load and a supply voltage that corresponds to the fixed load current, the fixed load current different from an actual current drawn by the load, the power manager is to determine the fixed load current and the supply voltage based on first load current information for the first performance state of the load, the first load current information to identify a plurality of sub-bands within a current range of the load, wherein a different fixed current value is assigned to each sub-band and wherein the fixed load current determined by the power manager corresponds to the fixed current value assigned to a sub-band in which the actual load current is located, and wherein the power manager is to control the power delivery circuit to output the supply voltage to the load.

2. The system of claim 1, wherein the supply voltage output from the power delivery circuit is set to compensate for losses that occur along a signal path between a power delivery circuit and the load.

3. The system of claim 1, further comprising:
a memory to store the first load current info nation for the first performance state of the load.

4. The system of claim 1, wherein each sub-band includes a plurality of current values and wherein the fixed current value assigned to each sub-band corresponds to a maximum current value of the sub-band.

5. The system of claim 1, wherein:
the first performance state of the load corresponds to a first operating frequency, and
the power manager is to control the power delivery circuit to output a different supply voltage to the load when the first performance state of the load is to change to a second performance state.

6. The system of claim 5, wherein the different voltage and the corresponding current are based on a second fixed load current and supply voltage respectively, the second fixed load current and supply voltage generated from second load current information generated for a second performance state different from the first performance state.

7. The system of claim 6, wherein the second load current information is generated from a different arrangement of sub-bands from the first load current information.

8. The system of claim 1, wherein the supply voltage output from the power delivery circuit is adjusted to compensate for losses that occur along a signal path between the power delivery circuit and the load.

9. The system of claim 1, wherein the load is a processing circuit.

10. The system of claim 1, wherein the power manager is to estimate current demand change based on load status and is to send information of the estimated current demand change at a beginning of a load transition to the power delivery circuit, to improve transient response time by determining an optimal operating mode in the power delivery circuit.

11. A power management method comprising:
detecting a first performance state of a load;
determining a fixed load current that corresponds to the first performance state;
determining a supply voltage that corresponds to the fixed load current, the fixed load current and the supply voltage are determined based on first load current information for the first performance state of the load, the first load current information to identify a plurality of sub-bands within a current range of the load, wherein a different fixed current value is assigned to each sub-band and wherein the determined fixed load current corresponds to the fixed current value assigned to a sub-band in which the actual load current is located; and outputting the supply voltage from a power delivery circuit to the load, wherein the fixed load current is different from an actual current drawn by the load.

12. The method of claim 11, wherein the supply voltage output from the power delivery circuit is set to compensate for losses that occur along a signal path between a power delivery circuit and the load.

13. The method of claim 11, further comprising:
determining a first operating frequency that corresponds to the performance state; and
determining the fixed load current based on the operating frequency.

14. The method of claim 13, further comprising:
storing the first load current information for the first operating frequency of the load.

15. The method of claim 11, wherein each sub-band includes a plurality of current values and wherein the fixed current value assigned to each sub-band corresponds to a maximum current value of the sub-band.

16. The method of claim 11, wherein:
the first operating frequency corresponds to the first performance state of the load,
wherein a different voltage corresponding to a different drawn current is supplied to the load when the first performance state of the load is changed to a second performance state.

17. The method of claim 16, wherein the different voltage and the different current are based on a second fixed load current and supply voltage respectively, the second fixed load current and supply voltage generated from second load current information generated for a second operating frequency different from the first operating frequency.

18. The method of claim 17, wherein the second load current information is generated from a different arrangement of sub-bands from the first load current information.

19. A power management system comprising:
a power delivery circuit to output power to a load;
a power manager to control the power delivery circuit; and
a memory to store information,
wherein the power manager is to determine a fixed load current that corresponds to a first performance state of the load and a supply voltage that corresponds to the fixed load current, the fixed load current different from an actual current drawn by the load, and
the memory to store the first load current information for the first performance state of the load, the first load current information to identify a plurality of sub-bands within a current range of the load, wherein a different fixed current value is assigned to each sub-band and wherein the fixed load current determined by the power manager corresponds to the fixed current value assigned to a sub-band in which the actual load current is located, and wherein the power manager is to control the power delivery circuit to output the supply voltage to the load.

20. The power management system of claim 19, wherein each sub-band includes a plurality of current values, and the fixed current value assigned to each sub-band corresponds to a maximum current value of the sub-band.

21. The power management system of claim 19, wherein:
the first performance state of the load corresponds to a first operating frequency, and
the power manager is to control the power delivery circuit to output a different supply voltage to the load when the first performance state of the load is to change to a second performance state.

22. The power management system of claim 21, wherein the different voltage and the corresponding current are based on a second fixed load current and supply voltage respectively, the second fixed load current and supply voltage provided from second load current info nation for a second performance state different from the first performance state.

23. The power management system of claim 22, wherein the second load current information is provided from a different arrangement of sub-bands from the first load current information.

24. A power management method comprising:
   detecting a performance state of a load;
   determining a fixed load current that corresponds to the performance state by determining a first operating frequency that corresponds to the performance state, and determining the fixed load current based on the operating frequency;
   storing first load current information for the first operating frequency of the load, wherein the first load current information identifies a plurality of sub-bands within a current range of the load, wherein a different fixed current value is assigned to each sub-band, and wherein the fixed load current corresponds to the fixed current value assigned to a sub-band in which an actual current drawn by the load is located;
   determining a supply voltage that corresponds to the fixed load current; and
   outputting the supply voltage from a power delivery circuit to the load, wherein the fixed load current is different from an actual current drawn by the load.

25. The power management method of claim 24, wherein each sub-band includes a plurality of current values, and the fixed current value assigned to each sub-band corresponds to a maximum current value of the sub-band.

26. The power management method of claim 24, wherein:
   the first operating frequency corresponds to a first performance state of the load, and
   a different voltage corresponding to a different drawn current is provided to the load when the first performance state of the load is changed to a second performance state.

27. The power management method of claim 26, wherein the different voltage and the corresponding current are based on a second fixed load current and supply voltage respectively, and
   the second fixed load current and supply voltage provided from second load current information provided for a second operating frequency different from the first operating frequency.

* * * * *